United States Patent
Aihara et al.

(10) Patent No.: US 6,856,594 B1
(45) Date of Patent: Feb. 15, 2005

(54) ATM SWITCHING SYSTEM AND METHOD FOR SWITCHOVER BETWEEN WORKING CHANNEL AND PROTECTION CHANNEL IN AN ATM NETWORK

(75) Inventors: Naoki Aihara, Kawasaki (JP); Hichiro Hayami, Kawasaki (JP); Iwao Tada, Kawasaki (JP); Tomoyuki Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 653 days.

(21) Appl. No.: 09/634,387

(22) Filed: Aug. 9, 2000

(30) Foreign Application Priority Data

Aug. 9, 1999 (JP) .......................................... 11-224903

(51) Int. Cl.[7] .............................. H04L 1/22; H04L 12/56
(52) U.S. Cl. ..................... 370/228; 370/395.1; 370/535
(58) Field of Search ................................ 370/216–228, 370/235, 236, 360, 389, 395.1, 395.21

(56) References Cited

U.S. PATENT DOCUMENTS

| | | | | |
|---|---|---|---|---|
| 5,072,440 A | * | 12/1991 | Isono et al. .................. | 370/220 |
| 5,274,633 A | | 12/1993 | Kato et al. | |
| 5,488,606 A | * | 1/1996 | Kakuma et al. ............. | 370/219 |
| 5,513,191 A | * | 4/1996 | Takechi et al. .............. | 714/752 |
| 5,805,568 A | * | 9/1998 | Shinbashi .................... | 370/223 |
| 6,049,523 A | * | 4/2000 | Anderson et al. ........... | 370/217 |
| 6,317,414 B1 | * | 11/2001 | Naohiro ...................... | 370/222 |
| 6,353,593 B1 | * | 3/2002 | Chen et al. .................. | 370/216 |
| 6,359,857 B1 | * | 3/2002 | Ahmad et al. ............... | 370/217 |
| 6,359,858 B1 | * | 3/2002 | Smith et al. ................. | 370/217 |
| 6,442,131 B1 | * | 8/2002 | Kondo ......................... | 370/218 |
| 6,466,576 B2 | * | 10/2002 | Sekine et al. ............. | 370/395.1 |
| 6,487,169 B1 | * | 11/2002 | Tada ............................ | 370/219 |
| 6,542,461 B1 | * | 4/2003 | Faye et al. ................... | 370/225 |
| 6,600,719 B1 | * | 7/2003 | Chaudhuri ................... | 370/228 |
| 6,658,013 B1 | * | 12/2003 | de Boer et al. ............. | 370/404 |

* cited by examiner

*Primary Examiner*—Hassan Kizou
*Assistant Examiner*—Gregory Sefcheck
(74) *Attorney, Agent, or Firm*—Katten Muchin Zavis Rosenman

(57) ABSTRACT

A method and system including ATM switching equipment provided for switching between a working channel and a protection channel in an ATM network. The method and system include the following processes: In each cell for transmission providing an indication of whether the cell belongs connection currently in a working state via a working channel; cells are duplicated on each connection basis; the duplicated cells are transmitted simultaneously on both a working channel and a protection channel; and valid cells are selected from received cells according to the indication in each cell indicating whether the relevant connection is currently in a working state.

8 Claims, 4 Drawing Sheets

SW:ATM Switch
DMX:Demultiplexer
MUX:Multiplexer
LINF:Line Interface

US 6,856,594 B1

ATM SWITCHING SYSTEM AND METHOD FOR SWITCHOVER BETWEEN WORKING CHANNEL AND PROTECTION CHANNEL IN AN ATM NETWORK

FIELD OF THE INVENTION

The present invention relates to a method for switching over between working channels and protection channels provided in an ATM (asynchronous transfer mode) switching system and equipment in an ATM network.

BACKGROUND OF THE INVENTION

To improve network reliability against failures, the following methods have conventionally been applied in an ATM network, where a protection channel is provided in addition to a working channel.

(1) Automatic protection switching (APS) of the physical layer (hereafter referred to as the 'physical layer APS') which is defined in SDH, SONET and the like, or (2) Path re-establishment and switchover using signaling procedure.

The above methods, however, have disadvantages shown below:

In the method (1), a bandwidth for a protection channel must constantly be reserved corresponding to bandwidth of a physical channel. This reduces efficient use of network resources. In the above method (2), long interruption time against normal service is needed because of substantial time consumption for exchanging signals between nodes, and for executing a software process sequence to search for an idle route and to carry out path establishment and switchover.

SUMMARY OF THE INVENTION

It is therefore an object of the present invention to provide a method and equipment for switchover between a working channel and a protection channel in an ATM network, with a simplified and efficient manner to compensate the aforementioned disadvantage of the physical layer APS.

A method and equipment for addressing the above issue of the present invention to switch over between a working channel and a protection channel in an ATM network includes the following steps: indicating in a cell for transmission whether the cell is object for channel switchover; duplicating the cell in each connection; transmitting the duplicated cell simultaneously both to a working channel and to a protection channel; and selecting a received cell according to an indication whether the cell belongs to a connection currently in working state.

Preferably, a cell not indicated as being in a connection currently in working state is discarded.

Furthermore, preferably, the indication of cell of which connection is not object for the switchover is specified at the unit of a connection group.

Other features of the present invention will be apparent by the following description on the embodiments of the invention referring to the accompanied drawings.

PREFERRED EMBODIMENTS OF THE INVENTION

An embodiment of the present invention is described hereinafter with the accompanied drawings wherein like numerals and symbols refer to like parts.

Prior to explaining the embodiments of the present invention, a basic concept of the 'physical layer APS' is explained first for easier understanding of the invention.

Figure 1:
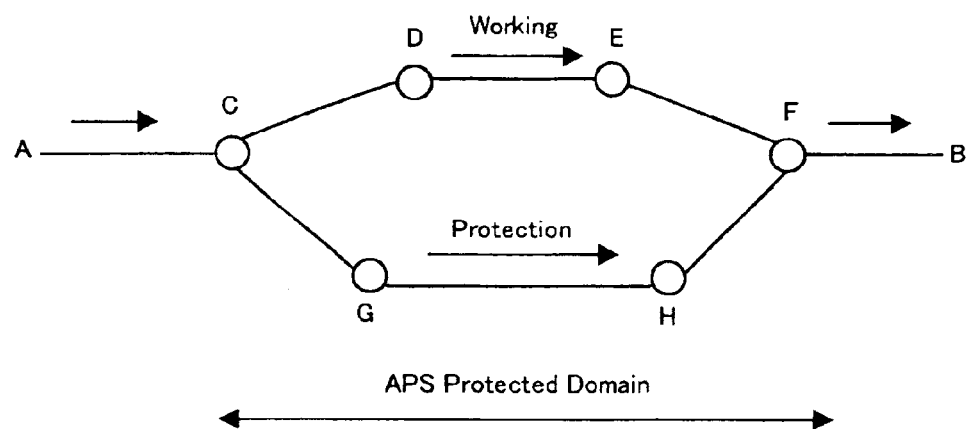
FIG. 1 shows a basic concept of the physical layer APS applied in the present invention.

In FIG. 1, a general diagram of the physical layer APS is shown. A node terminating the ATM layer is shown indicating a situation that a connection is currently established between a node A to a node B. ATM cells each consisting of a header and a payload are transmitted on the connection.

As routes of the connection, a path is being established through nodes C-D-E-F constituting a working channel, and also a path through nodes C-G-H-F constituting a protection channel. The duplicated channel segment consisting of the working channel and the protection channel is called a 'protected domain', to which the physical layer APS is applied.

Note that a transmission path shown in FIG. 1 does not mean a physical line, but the path means a virtual channel on the ATM layer.

In such a network configuration, the physical layer APS is a mechanism to switch over from a working channel to a protection channel in case a failure occurs at an arbitrary point on the working channel. The switchover is generally triggered by the detection of an alarm indicating signal on a virtual path and a virtual channel (VP/VC-AIS; hereafter simply referred to as AIS). The above AIS is detected at a terminating point (node F in the case of FIG. 1) of a segment which is defined as a protected domain of the connection.

For example, when a physical failure such as a breakdown of a fiber transmission line occurs between node C and node D, this situation is detected at node D, producing an AIS cell to forward from node D in the downstream direction (i.e. in the direction toward node F).

Here, the AIS cell is a cell containing an AIS in an ATM cell header. The AIS cell is detected by node F at which the protected domain is terminated. On this detection, the relevant segment is declared inoperable. At the same time an APS procedure is started.

The APS can be classified into the following schemes with respect to the provision of protection channels. One method is that one protection channel is provided corresponding to each working channel i.e. 1+1 or 1:1 scheme; the other is, using a shared protection channel, either one protection channel shared by n working channels i.e. 1:n scheme, or m protection channels shared by n working channels i.e. m:n scheme ($m \leq n$).

The difference between 1+1 scheme and 1:1 scheme is that in 1+1 scheme the identical cells are normally transmitted on both a working channel and a protection channel, while in 1:1 scheme cells are transmitted only on a channel currently in working state (i.e. a working channel).

From another aspect, the APS can be classified into a VP/VC-APS method in which a switchover is carried out at the unit of each VP/VC (virtual path and virtual channel) connection, and a VPG/VCG-APS method in which a switchover is carried out at the unit of a group of VP/VC connections.

The object of the present invention is to realize the above-mentioned physical layer APS with a simplified configuration.

Figure 2:
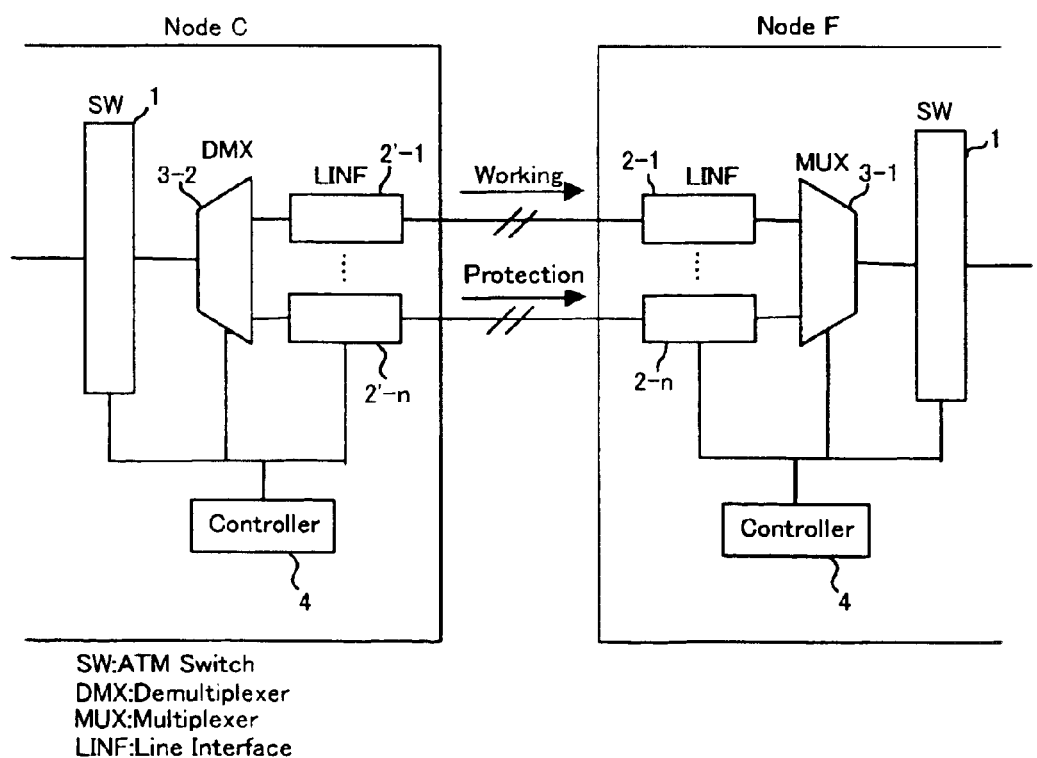
FIG. 2 shows a configuration diagram of a node C and a node F located at either ends of a protection domain shown in FIG. 1.

In FIG. 2, there is shown a configuration example of a node in accordance with the present invention. The node is located at either end of a protection domain shown in FIG. 1. Only node C and node F are shown in this figure where other intermediate nodes are omitted.

Each node consists of an ATM switching system which is provided with the following elements: an ATM switch circuit (SW) 1 for performing a cell switching function; external line interface portions (LINF) 2'-1 to 2'-n for inserting cells, to be output to an external line side; and internal line interface portions (LINF) 2-1 to 2-n for extracting cells; transmitted from the external line.

Also, there are provided in each node a multiplexer (MUX) 3-1 for multiplexing input ATM cells extracted by the internal line interface portions 2-1 to 2n, interfacing with ATM switch circuit 1; a demultiplexer (DMX) 3-2 for demultiplexing multiplexed ATM cells, also interfacing with ATM switch circuit 1; and a controller 4 for performing overall control function.

Referring to FIG. 2, an operation of the physical layer APS in accordance with the present invention is explained hereafter, kg where 1+1 or 1:1 scheme is taken as an example.

(1) At an initial state, the identical cells are being transmitted on both working channels and protection channels. In node C, a connection for the APS is identified at demultiplexer (DMX) 3-2 under the control of controller 4, to duplicate cells on a working channel side to a protection channel side.

(2) When a failure occurs on a working channel between node C and node D, node D detects the failure and then transmits an AIS cell in the downstream direction toward node F. This AIS cell is detected by node F, of which information is transferred to controller 4.

(3) Controller 4 orders (control command) the ATM switch circuit 1 to switchover from an internal line interface portion, where the working channel is terminated, to another internal line interface portion where the protection channel is terminated, by designating the connection for the APS (from (I) above). More specifically, using a function provided in each internal line interface portion (LINF) 2-1 to 2-n, an ACT bit in each ATM cell header in transmission is set either 'ON' or 'OFF'. The ACT bit denotes the internal line interface portion where the protection channel is terminated when set 'ON', or denotes the internal line interface portion where the working channel is terminated when set 'OFF'.

(4) A mechanism is provided in multiplexer (MUX) 3-1 that the ACT bit in each cell received from line interface portions 2-1 to 2-n is examined to determine whether the cell is to be transmitted. Only cells having proper ACT indication are allowed to transmit. In multiplexer (MUX) 3-1 in node F, a previous condition that only ATM cells received on the working channel are transmitted through and ATM cells on the protection channel are rejected to transmit, is now switched over to that only ATM cells received on the protection channel can be transmitted through. Thus an operation of the physical layer APS is completed.

According to the present invention, the following functional elements are provided for realizing a sequence of operation described above in an ATM node;

(1) in demultiplexer (DMX) 3-2, duplicating cells on a working channel to a protection channel side at the unit of either a connection or a connection group, (2) in line interface portions 2-1 to 2-n, providing each ATM cell header with an ACT bit for specifying ACT (in working condition) at the unit of either a connection or a connection group, and (3) in multiplexer (MUX) 3-1, transmitting only cells of which ACT is specified in each cell header.

A detailed embodiment of the functional elements (1) to (3) above is described hereinafter.

Figure 3:
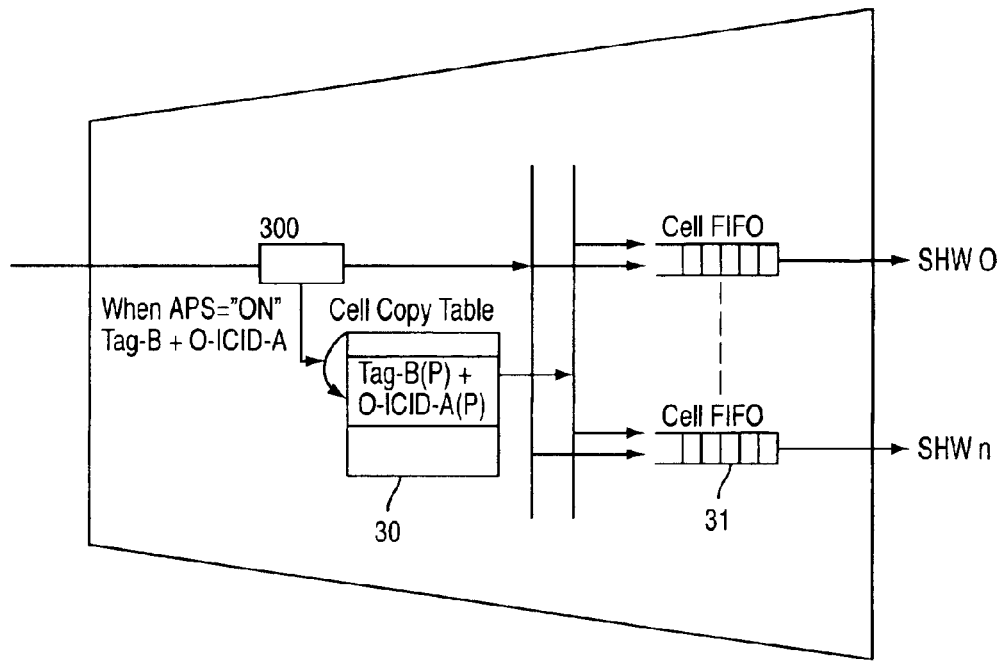
FIG. 3 shows a configuration block diagram realizing a functional element of a demultiplexer (DMX) 3-2.

In FIG. 3, functional elements of demultiplexer (DMX) 3-2 provided in each node is are shown.

In this FIG. 3, Tag-B is a tag provided in an ATM cell header for identifying an output channel. O-ICID-A is also provided in the ATM cell header, which is an 'a channel identifier' for identifying a channel in the output channel indicated by Tag-B.

An APS identifier is also provided in the ATM cell header which enables to determine whether a connection (or a connection group) of the relevant cell is object for the APS processing or not.

The tag and the channel identifier explained above are set into an ATM cell header at either line interface portions 2-1 to 2-n and 2'-1 to 2'-n, multiplexer (MUX) 3-1, or ATM switch circuit 1, under the control of controller 4.

For example, in node C shown in FIG. 3, an APS identifier provided in the ATM cell header of an ATM cell input to demultiplexer (DMX) 3-2 is examined in a circuit 300. If this APS identifier indicates the cell is the object for the APS processing (i.e. APS is 'ON'), then a cell duplication table 30 is referred to, using Tag-B and O-ICID-A, which are also derived from the ATM cell header in the circuit 300 as the reference keys or address codes for accessing.

Through the above procedure, information on an output line Tag-B(P) to be used for an protection channel and a channel O-ICID-A(P) in the above output line is obtained. Then the ATM cell is duplicated and the information on an output line and a channel in the duplicated cell are respectively replaced by Tag-B(P) and O-ICID-A(P), to output to a cell buffer (FIFO) 31.

Figure 4:
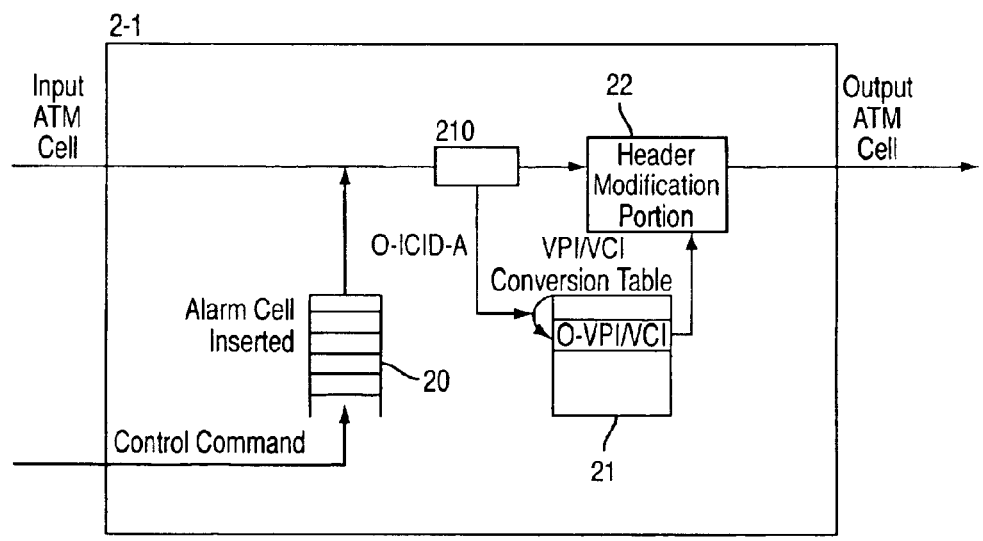
FIG. 4 shows a configuration block diagram of line interface portions 2'-1 to 2'-n in the downstream side of node C shown in FIG. 2.

In FIG. 4, there is illustrated a configuration block diagram of, for example, line interface portion 2-1 on the internet line side at which is the ATM cell is input, in node D, for example, located in the downstream direction against node C. In this FIG. 4, O-VPI/VCI is stored in a cell header, showing a value of VPI/VCI (virtual path and virtual channel identifier) of an output line related to the cell, and is detected in the cell header by a circuit 210.

Using as a reference key or address code, an internal line and a channel identifier O-ICID-A, which is detected from the cell header of an input ATM cell in a circuit 210, a VPI/VCI conversion table 21 is referred to. Then, VPI/VCI to be forwarded to an output line is obtained from VPI/VCI conversion table 21.

The obtained VPI/VCI is set into the ATM cell header in a header modification portion 22, to forward to the external transmission line.

Also, in line interface portion 2-1 on the internal line side, there is provided an alarm cell insertion circuit 20 to insert an alarm cell named VPI/VC-AIS. When a failure occurs between node C and node D, and node D detects this failure, an alarm cell is inserted according to a control command issued from controller 4.

Here, an alarm cell is a kind of ATM cell in which an alarm indicating signal (AIS) is set in an ATM cell header. The alarm cell is detected in the downstream node (for example, node F in the network configuration shown in FIG. 1) to trigger THE APS operation.

Figure 5:
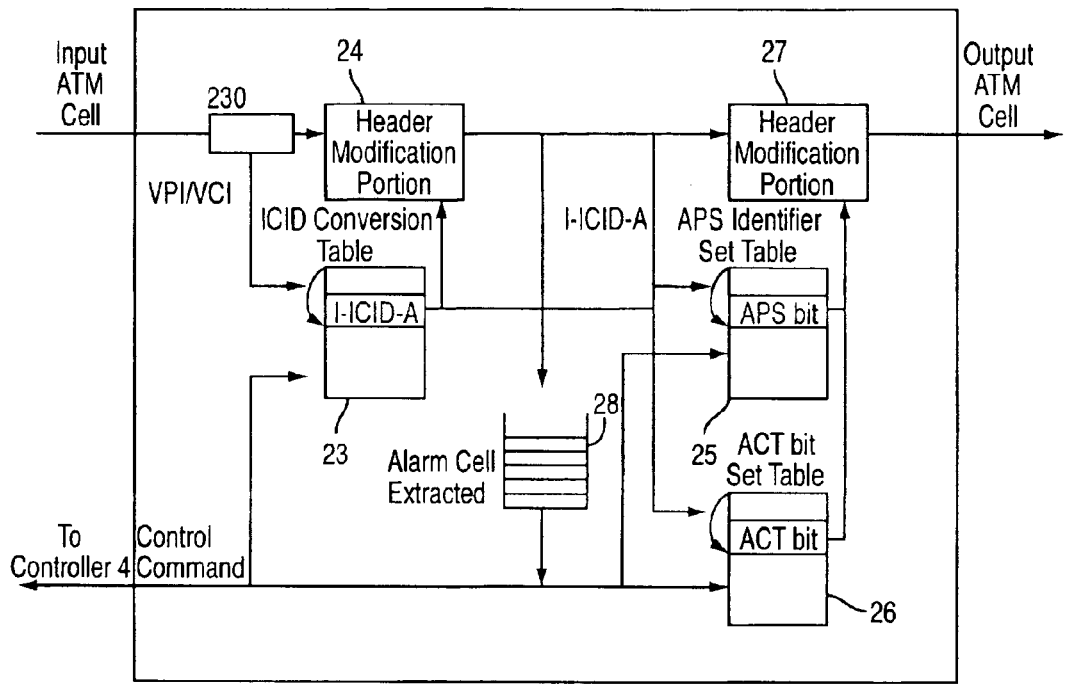
FIG. 5 shows a configuration block diagram of line interface portions 2-1 to 2-n in the upstream side of node F shown in FIG. 2.

In FIG. 5, there is shown a block diagram of a configuration example related to the input side of line interface portion 2-1 in node F which constitutes a terminal node of a protected domain. An ICID conversion table 23 is referred to by using as a reference key, VPI/VCI, which is an external virtual path and virtual channel identifier detected in a circuit 230 from a header of an input ATM cell, and then a corresponding internal virtual path and virtual channel identifier, I-ICID-A, is obtained.

The reason for the above processing is that VPI/VCI is composed of 22 bits and requires a large number of circuits to process in ATM switch circuit 1. Therefore, VPI/VCI is converted into I-ICID-A which is a condensed form of the internal path and channel identifier. A header modification portion 24 replaces VPI/VCI with the obtained I-ICID-A in an ATM cell header.

Then, using the obtained I-ICID-A as a reference key, an APS identifier set table 25 is referred to. Depending on 'ON' or 'OFF' of an APS bit in APS identifier set table 25, whether the corresponding internal path and channel is object for the APS or not is determined.

Furthermore, using the value of I-ICID-A as a reference key, an ACT bit set table 26 is referred to. The ACT bit indicates whether each object cell for the APS is actually to be transmitted to a destination terminal.

The APS bit and the ACT bit which have been referred to are attached to an ATM cell header by a header modification portion 27.

Values in tables 25 and 26 for determining that a cell is an object for the APS etc. are set by a control command from controller 4 either in advance or as necessary.

Furthermore, in FIG. 5, an alarm cell extraction portion 28 is provided for extracting an alarm cell sent from an upstream node to inform to controller 4.

Figure 6:
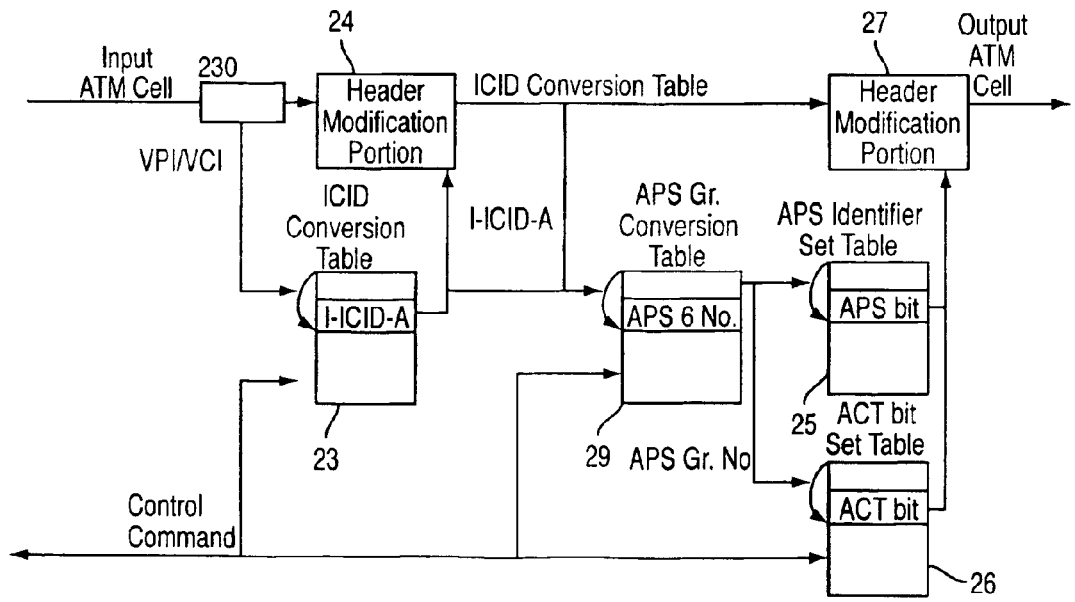
FIG. 6 shows an embodiment for setting an ACT bit into an ACT bit set table 25 promptly to reduce an APS switchover time.

In FIG. 5, setting for the APS identifier set table 25 and the ACT bit set table 26 is carried out by an order (command) from controller 4 in a procedure after the APS is started. FIG. 6 shows a configuration of an embodiment to set the APS identifier set table 25 and the ACT bit set table 26 with high-speed so that the required time for an APS switchover can be shortened.

In FIG. 5, when an APS switchover occurs, it is necessary to rewrite all data related to the corresponding connection in the APS identifier set table 25 and the ACT bit set table 26, which may necessitate large processing time.

On the other hand, according to the configuration shown in FIG. 6, a tables 25 and 26 are provided for use of setting APS bits and ACT bits at the unit of an APS group (APS-Gr.). This enables the setting of the tables B from controller 4 at the unit of APS group i.e. in a batch of lines, instead of individual line by line, with less processing time.

In order to refer to these tables 25 and 26, information is required to identify which APS group each connection belongs to. For this purpose, an APS group conversion table 29 is provided for obtaining APS-Gr from I-ICID-A having been extracted from ICID conversion table 23. Each APS group is generally assigned corresponding to each outgoing line of ATM switch circuit 1.

Using an APS group obtained from APS group conversion table 29, an APS identifier set table 25 is referred to. Also ACT bit set table 26 is referred to using an APS group obtained from APS group conversion table 29.

Figure 7:
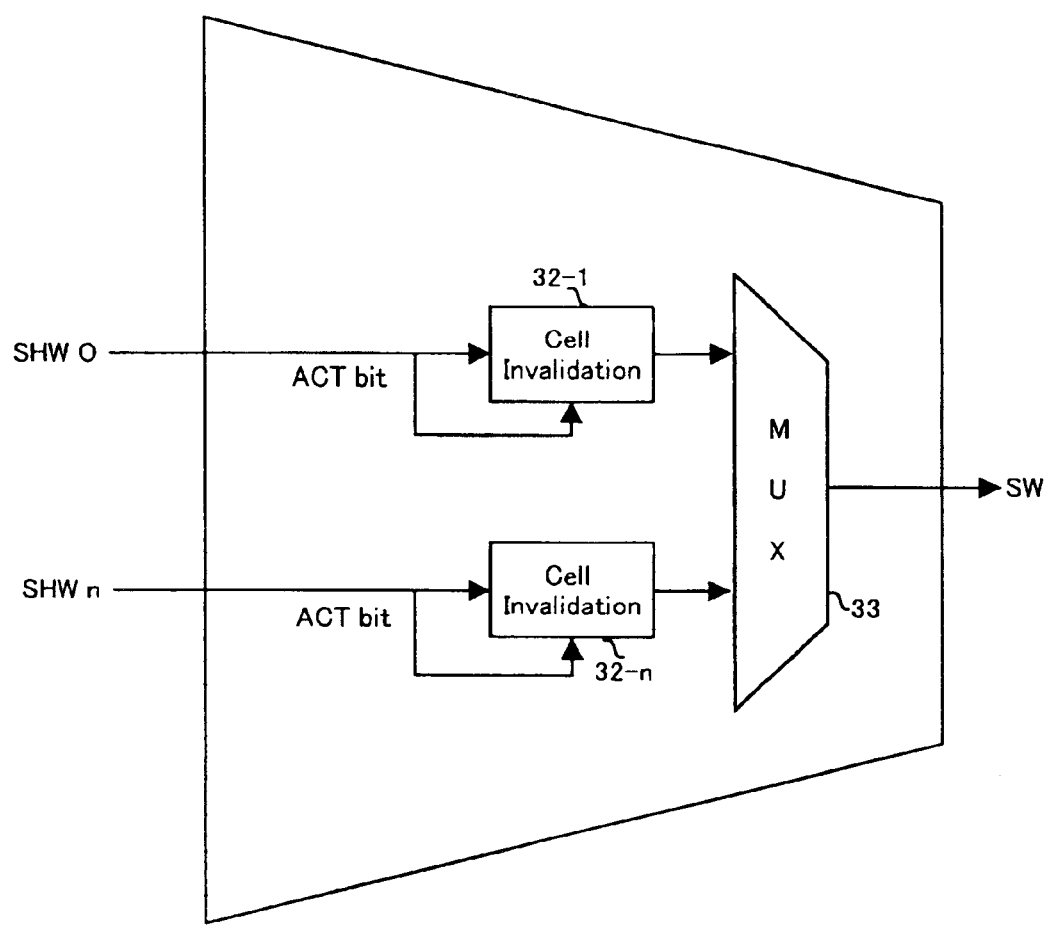
FIG. 7 shows a configuration block diagram of a multiplexer (MUX) 3-1 shown in FIG. 2.

In FIG. 7, there is shown a configuration block diagram of multiplexer (MUX) 3-1 shown in FIG. 2. Among ATM cells received from each channel route SHW0 to SHWn, only ATM cells received on a protection channel side having 'ON' in each ACT bit are transmitted through cell invalidation circuits 32-1 to 32-n. ATM cells transmitted through are then multiplexed by a multiplexing circuit 33 to forward to ATM switch circuit 1.

Having been explained referring to the accompanied drawings, the present invention provides a concrete configuration for realizing ATM layer protection switching (APS). An ATM switching system according to the present invention can be provided with simple configuration.

The foregoing description of the embodiment is not intended to limit the invention to the particular examples. Any suitable modification may be resorted to the scope of the invention. All features and advantages of the invention which fall within the scope of the invention are covered by the appended claims.

What is claimed is:

1. An ATM switch system provided at each node in an ATM network, which switches over a working channel to a protection channel, within a protection domain of a duplicated channel segment constituting the working and protection channels, the ATM switch system comprising:

an ATM switch circuit performing a cell switching function;

external line interface portions each inserting cells, located at an external line side;

internal line interface portions each extracting cells, located at an internal line side;

a multiplexer multiplexing cells input from the internal line interface portions and interfacing with the ATM switch circuit;

a demultiplexer interfacing with the ATM switch circuit and demultiplexing multiplexed ATM cells; and a controller, wherein demultiplexer of an ATM switch system of a source node located at a starting point of the protection domain identifies a connection for APS processing, and duplicates cells on a working channel to a protection channel, an ATM switch system at an intermediate node located downstream from the starting point of the protection domain detects a failure on the working channel and transmits an AIS cell in a down stream direction toward an ATM switch system of a destination node located ax a terminal point of the protection domain, the ATM switch system of the destination node located at the terminal point of the protection domain detects the AIS cell, and transfers it to the controller, the controller orders the ATM switch system to switch over from an internal line interface portion at which the working channel is terminated to another internal line interface portion at which the protection eel is terminated, and the multiplexer allows only ATM cells identified as the connection for APS processing, and wherein the in the interface in the ATM switch at the intermediate node includes a VPI/VCI converting table a header modification portion and an alarm cell insertion circuit, refers to the VPI/VCI converting, table using as a reference key an internal channel and a channel identifier for an input ATM cell to obtain a external channel to be output in the external line interface portions and a virtual channel identifier, sets the obtained virtual channel identifier on the ATM cell at the header modification portion, and when detecting a failure between the upward staring point and the intermediate node, inserts an alarm cell at the alarm cell insertion circuit according to a control command from the controller.

2. The ATM switch system according to claim 1, wherein the demultiplexer in the ATM switch system of the source node located at an upward starting point of the protection domain includes a cell copy table storing information of an output line to be used for a protection channel of a channel in the output line, identities an identifier in a header of an input cell, indicating whether or not the input cell is of a connection for APS processing, when the identifier indicates the input cell is of the connection for APS processing, refers to the cell copy table, using as a reference key an identifier identifying a channel in a output line specified by a Tag to obtain information on an output line to be used for a protection channel and a channel in the output line, and duplicates the input cell, sets in the duplicated cell the obtained information on an output line to be used for a protection channel and a channel in the output line and outputs the duplicated cell.

3. The ATM switch system according to claim 2, wherein the multiplexer includes cell invalidation circuits each corresponding to a channel route, and only cells to which the ACT bit is set ON in the protection channel are transmitted through the cell invalidation circuits.

4. The ATM switch system according to claim 1, wherein the internal line interface in an ATM switch at the destination node located at a downstream termination point of the protection domain includes a VPI/VCI conversion table, a header modification portion, APS bit set table, and ACT bit set table, refers to the VPI/VCI conversion table by using a channel and a virtual channel identifier provided in an input ATM cell as a reference key to obtain an internal channel and a virtual channel identifier, converts the obtained internal channel and virtual channel identifier to a condensed internal channel and virtual channel identifier, modifies the header portion of the input ATM cell with the obtained and condensed internal channel and virtual channel identifier, refers to the APS bit set Table by using as a reference key the obtained and condensed internal channel and virtual channel identifier, to determine whether the internal channel and virtual channel identifier are an object for APS processing according to a referenced APS bit, refers to the ACT bit set table by using as a reference key the condensed internal channel and virtual channel identifier, to determine whether or not a cell determined for APS processing is a cell to be transmitted to a user, and modifies the header of the ATM cell with the APS bit and the ACT bit at the header modification portion to output the ATM cell.

5. The ATM switch system according to claim 4, further comprising an ACT bit set table in which an ACT bit is set in group unit; and an APS group conversion table and an APS identifier set table, wherein the condensed internal channel and channel identifier are used to refer to the APS group conversion table, and the APS group obtained from the APS group conversion table is used to refer to the ACT bit set table.

6. The ATM switch system according to claim 5, wherein the multiplexer includes cell invalidation circuits each corresponding to a channel route, and only cells to which the ACT bit is set ON in the protection channel are transmitted through the cell invalidation circuits.

7. The ATM switch system according to claim 4, wherein the multiplexer includes cell invalidation circuits each corresponding to a channel route, and only cells to which the ACT bit is set ON in the protection channel are transmitted through the cell invalidation circuits.

8. The ATM switch system according to claim 1, wherein the multiplexer includes cell invalidation circuits each corresponding to a channel route, and only cells to which the ACT bit is set ON in the protection channel are transmitted through the cell invalidation circuits.

* * * * *